UNITED STATES PATENT OFFICE.

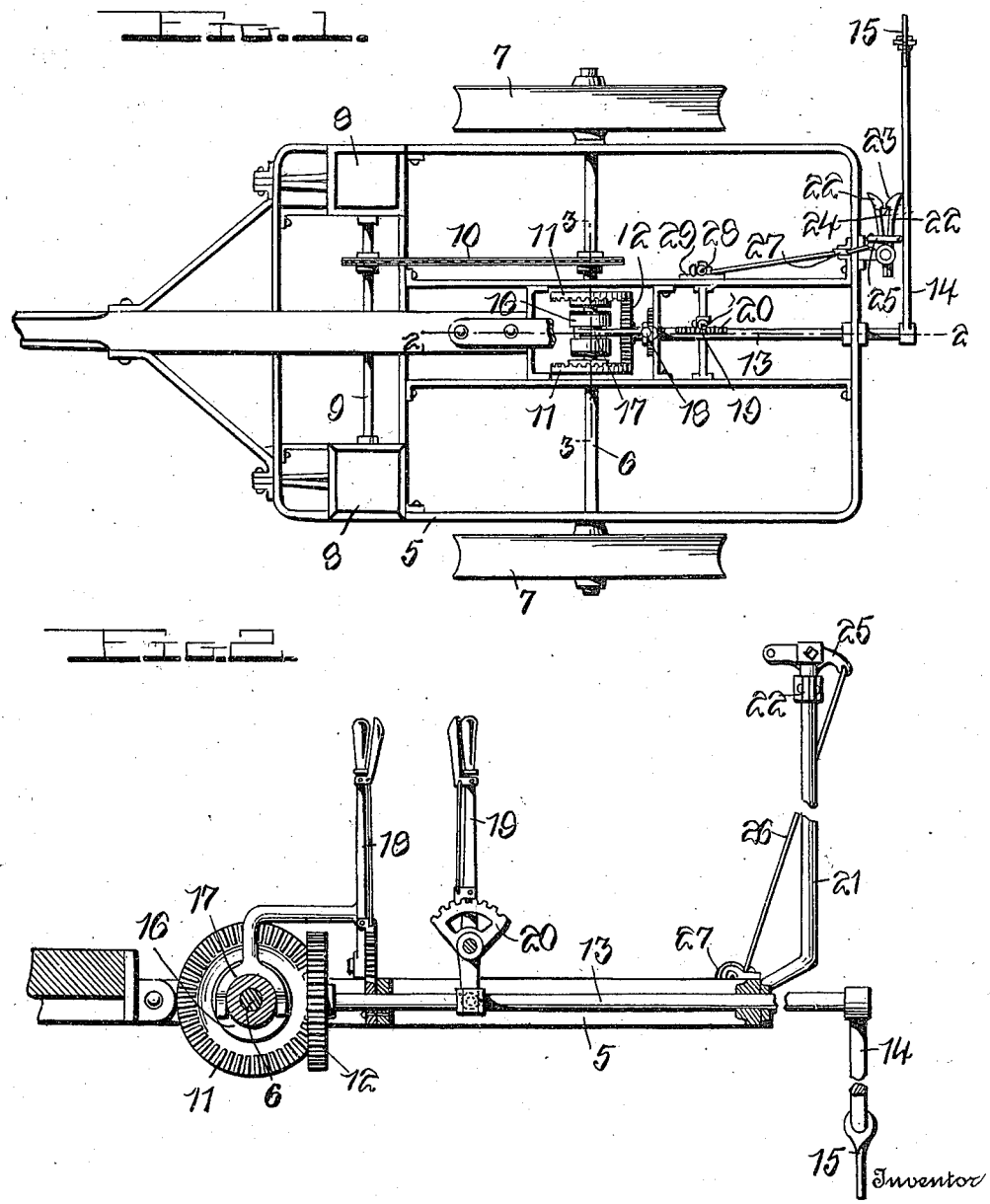

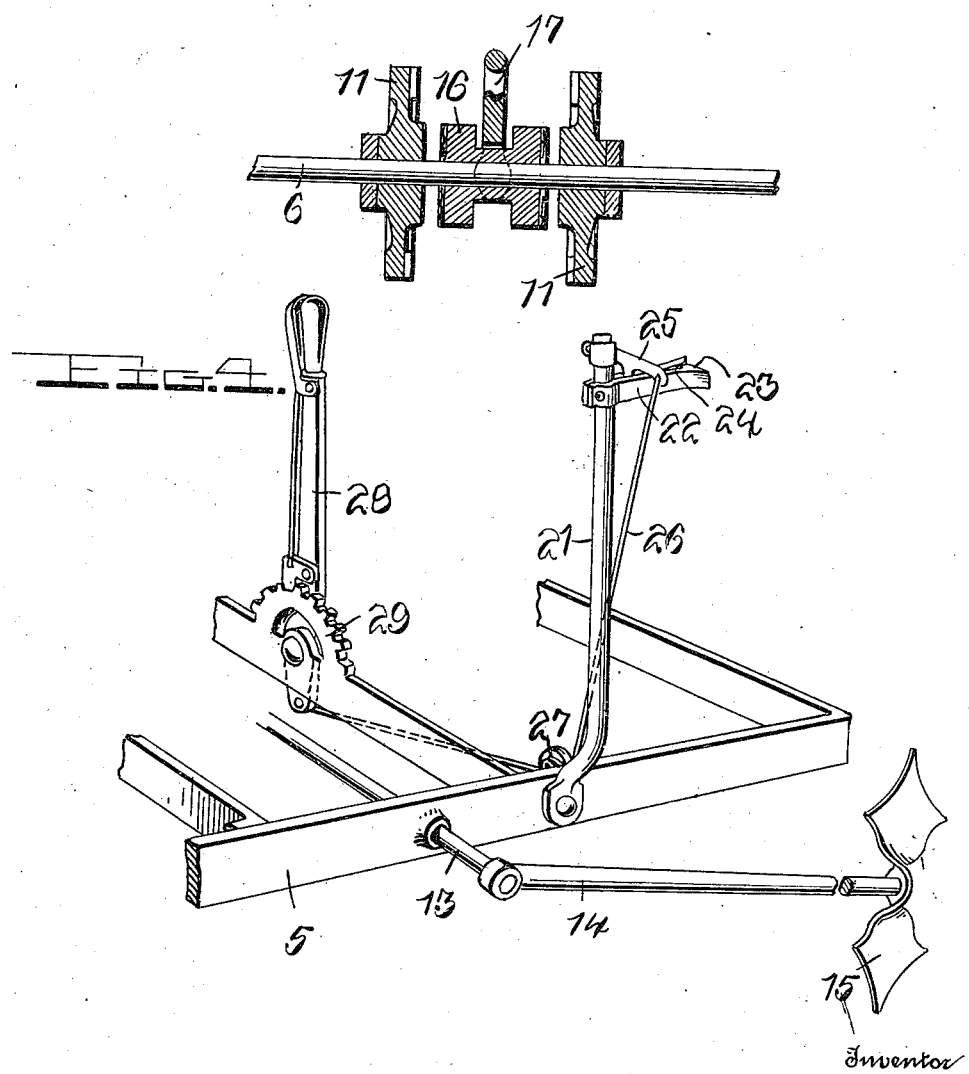

HAROLD S. KELLANDER, OF IMOGEN, MINNESOTA.

LAND-MARKER.

964,027.  Specification of Letters Patent.  Patented July 12, 1910.

Application filed April 27, 1910. Serial No. 558,015.

*To all whom it may concern:*

Be it known that I, HAROLD S. KELLANDER, a citizen of the United States, residing at Imogen, in the county of Martin and State of Minnesota, have invented certain new and useful Improvements in Land-Markers, of which the following is a specification, reference being had to the accompanying drawings.

This invention relates to seed planters and more particularly to new and novel means for operating the marker arm whereby the seed may be planted in parallel rows.

Another object resides in the provision of means for supporting the marker arm in inoperative position, suitable means being arranged upon said support and adapted to be actuated by the operator to release said arm.

A further object is to provide means mounted upon the wheel axle whereby the marking arm may be disposed upon either side of the machine to provide a guide line.

With these and other objects in view, the invention consists of the novel features of construction, combination and arrangement of parts hereinafter fully described and claimed, and illustrated in the accompanying drawings, in which—

Figure 1 is a top plan view of a seed planting machine embodying my improvements; Fig. 2 is a section taken on the line 2—2 of Fig. 1; Fig. 3 is a section taken on the line 3—3 of Fig. 1; and Fig. 4 is an enlarged detail perspective view of the supporting arm and the releasing or tripping device.

Referring more particularly to the drawings 5 indicates the frame of the machine in which the wheel axle 6 is mounted. The ground wheels 7 are rigidly secured upon the ends of this axle. The seed boxes 8 are supported upon opposite sides of the machine frame and the seed dropping mechanisms are connected by the transverse shaft 9. This shaft and the wheel axle each have a sprocket secured thereon, said sprockets being connected by an endless drive chain 10 whereby the seed dropping mechanisms are simultaneously operated to intermittently deposit the seed.

Upon the wheel axle 6 and between the intermediate longitudinal frame bars, the gears 11 are loosely mounted. These gears 11 as shown are preferably formed with teeth upon their opposed faces which are adapted to mesh with the teeth of the gear 12 rigidly secured upon one end of a longitudinally disposed shaft 13 mounted in the machine frame. To the rear end of this shaft the marking arm 14 is secured which extends beyond the side of the frame and carries the marking foot 15 which is adapted to engage with the ground and provide a guide line for the purpose which will be more fully hereinafter set forth.

Between the crown gears 11 a sliding clutch head 16 is keyed upon the wheel axle. This clutch head is provided with friction disks upon its ends and is formed with an intermediate annular groove which is adapted to receive the arms of a bifurcated operating lever 17. This lever is pivotally mounted upon a rack 18 secured to the machine frame and carries the usual spring controlled dog for engagement with the teeth of the rack. The gears 11 are also adapted to be frictionally engaged by the disks on the ends of the clutch head 16 thus locking the gear upon the axle 6. It will be obvious that as the clutch head is moved upon the shaft into engagement with either of the gears 11, the shaft 13 will, be caused to rotate, and when the shaft is moved to engagement with the other gear the shaft is rotated in the opposite direction whereby the marking arm 14 is swung to the opposite side of the machine frame 5. The shaft 13 is adapted for longitudinal movement in the frame to disengage the gears 11 and 12 when the marking device is not being used. For this purpose a lever 19 is mounted upon a rack 20 carried by the frame, said lever being connected at its lower end to the shaft 13 whereby when said lever is moved and locked upon the rack, the gear 12 will be held in operative or inoperative position.

In order to support the marking arm out of contact with the ground when the same is not in use, I provide a standard 21 rigidly fixed to the rear of the frame 5 at its center. Adjacent to the upper end of the standard 21 two opposed spring metal plates 22 are secured, the upper ends of said plates being flared as shown at 23 and provided with the shoulders 24. A releasing dog 25 is pivotally secured to the upper end of the standard 21 and is of substantially wedge shape form, the point of the wedge being disposed between the resilient clamping plates 22. To one end of this dog 25 an operating cable 26 is secured, said cable passing around a pulley 27 secured to the frame and having its other end connected to a lever 28 adapted to be actuated by the driver, said lever being mounted upon a rack 29 arranged upon the frame 5. The marking arm 14 is adapted to engage between the flared end of the transversely disposed clamping plates 22, the shoulders 24 formed on the ends of said plates preventing any accidental outward movement of said arm. When it is desired to release the marking arm, the operator throws the lever 28 forwardly which draws open the cable 26 and causes the wedge shaped releasing dog 25 to engage the clamping plates and spread the same apart whereby the marking arm will gravitate outwardly and downwardly beyond one side of the frame of the machine.

From the above it will be seen that I have devised a simple and efficient means for actuating the marking arm of a seed planter whereby it may be positioned upon either side of the machine to provide a guide line in which the wheels are disposed upon the return trip of the planter from one end to the other of a field. In this way the seed may be deposited in parallel rows equally spaced apart. The arm holding device and the releasing means therefor is also of great convenience as it will securely hold the arm in a lifted position when it is not desired to use the same. Of course the usual driver's seat is mounted upon the frame in position whereby the various levers may be conveniently operated. The clutch head and the gears 11 would preferably be formed in two sections whereby they may be readily arranged upon the wheel axles of planters now in common use. These sections may be connected by means of suitable bolts or other fastening means.

From the foregoing it is believed that the construction and operation of my improved land marker will be readily understood.

The machine is simple, of durable construction and highly efficient in its operation.

Owing to the simplicity of the same the machine can be manufactured at a very low cost.

While I have shown and described the preferred embodiment of my invention, it will be understood that the same is susceptible of many minor modifications without departing from the essential features or sacrificing any of the advantages thereof.

Having thus described the invention what is claimed is:—

1. In a machine of the character described, the combination with a wheel supported frame, of a longitudinally movable shaft mounted in said frame, a marking arm fixed to said shaft extending beyond the side of the frame, gearing arranged on the wheel axle, a gear on the shaft, means for moving said shaft longitudinally to engage the gear thereon with one of the gears on the axle to rotate said shaft, a standard secured to the machine frame, means arranged upon the upper end of said standard adapted to support the marking arm in an elevated position, and manually actuated means for releasing said marking arm from the supporting means, substantially as and for the purpose set forth.

2. In a machine of the character described, the combination with a wheel supported frame, of a longitudinally movable shaft mounted in said frame, a marking arm fixed on said shaft extending radially therefrom, means for rotating the shaft, a standard secured to the frame, spring plates secured to the upper end of the standard, a releasing dog arranged on the standard extending between the plates, said marking arm being adapted to engage between the spring plates and be supported therein in an inoperative position, and means for actuating said releasing dog to open said plates, substantially as and for the purpose set forth.

3. In a machine of the character described, the combination with a wheel supported frame, of a longitudinally movable shaft mounted in said frame, a marking arm fixed to said shaft, means for rotating the shaft to position the marking arm upon either side of the machine, a standard secured to the frame, spring plates secured to the upper end of said standard, releasing means carried by the standard extending between said plates, said marking arm being adapted to engage between the spring plates and to be held therein in an inoperative position, a lever pivotally mounted on the frame, and an operating connection between said lever and the releasing means to open the spring plates and release said marking arm, substantially as and for the purpose set forth.

4. In a machine of the character described, the combination with a wheel supported frame, of a shaft rotatably mounted and longitudinally movable in the frame, a marking arm fixed to said shaft extending beyond the side of the frame, a standard mounted on the frame, transversely disposed resilient locking plates secured to said standard, said plates being adapted to receive the arm between them and support the same in an inoperative position, means for spreading said plates apart to release the arm, a gear secured on the shaft, gears loosely mounted on the wheel axle adapted to engage with the gear on said shaft, a sliding clutch head arranged on the axle adapted to lock either of said gears thereon to rotate the shaft and position the marking arm on either side of the frame, and means for sliding said shaft in the frame to engage and disengage said gears, substantially, as and for the purpose set forth.

5. In a machine of the character described, the combination with a wheel supported frame, of a shaft rotatably mounted and longitudinally movable in the frame, a marking arm fixed on said shaft extending beyond the side of the frame, a vertically disposed standard carried by the frame, resilient plates secured to said standard having shoulders formed thereon, said marking arm being adapted to be received between said plates, a releasing dog pivotally mounted on the standard disposed between the plates, operating means for moving said dog to spread the plates and release the arm from between the same, a gear secured to one end of the shaft, gears loosely mounted on the wheel axle, and means for locking either of said gears on the axle to rotate said shaft and position the marking arm on either side of the machine frame, substantially as and for the purpose set forth.

In testimony whereof I hereunto affix my signature in the presence of two witnesses.

HAROLD S. KELLANDER.

Witnesses:
 A. L. KEITHAHN,
 E. R. FLYGARE.